(12) United States Patent
Woods et al.

(10) Patent No.: US 8,417,560 B2
(45) Date of Patent: Apr. 9, 2013

(54) SYSTEMS, METHODS, AND APPARATUS FOR ANALYZING THE INFLUENCE OF MARKETING ASSETS

(76) Inventors: Steven Woods, Toronto (CA); Andrea Corey, Toronto (CA)

(*) Notice: Subject to any disclaimer, the term of this patent is extended or adjusted under 35 U.S.C. 154(b) by 435 days.

(21) Appl. No.: 12/424,377

(22) Filed: Apr. 15, 2009

(65) Prior Publication Data

US 2009/0265221 A1 Oct. 22, 2009

Related U.S. Application Data

(60) Provisional application No. 61/046,220, filed on Apr. 18, 2008.

(51) Int. Cl.
*G06Q 10/00* (2012.01)
*G06Q 30/00* (2012.01)

(52) U.S. Cl.
USPC ....... 705/7.31; 705/7.29; 705/7.32; 705/7.33; 705/7.37; 705/14.41

(58) Field of Classification Search ........ 705/7.11–7.42, 705/14.41
See application file for complete search history.

(56) References Cited

U.S. PATENT DOCUMENTS

| | | | |
|---|---|---|---|
| 5,948,061 A | 9/1999 | Merriman et al. | |
| 6,449,634 B1 | 9/2002 | Capiel | |
| 6,618,747 B1 | 9/2003 | Flynn et al. | |
| 6,963,929 B1 | 11/2005 | Lee | |
| 6,973,492 B2 | 12/2005 | Streble | |
| 7,010,495 B1 | 3/2006 | Samra et al. | |
| 7,043,531 B1 * | 5/2006 | Seibel et al. .................. | 709/206 |
| 7,065,555 B2 | 6/2006 | Foulger et al. | |
| 7,072,947 B1 | 7/2006 | Knox et al. | |
| 7,076,533 B1 | 7/2006 | Knox et al. | |
| 7,120,590 B1 | 10/2006 | Eisen et al. | |
| 7,406,434 B1 | 7/2008 | Chang et al. | |
| 7,584,251 B2 | 9/2009 | Brown et al. | |

(Continued)

FOREIGN PATENT DOCUMENTS

| | | |
|---|---|---|
| EP | 0869652 A2 | 10/1998 |
| JP | 2006-313520 | 11/2006 |

(Continued)

OTHER PUBLICATIONS

"Eloqua Releases New Version of its Integrated Demand-Generation Platform for Business-to-Business Marketers" (May 2005) Eloqua Corporation (http://www.eloqua.com/news/press/Eloqua_Releases_New_Version_of_its_Integrated_De mand-Generation_Platform_for_Business-to-Business_Marketers.html).*

(Continued)

*Primary Examiner* — Lynda Jasmin
*Assistant Examiner* — Sujay Koneru
(74) *Attorney, Agent, or Firm* — Goodwin Procter LLP

(57) ABSTRACT

In various embodiments, the influence of marketing assets upon an individual are analyzed. In particular, a record of the individual's interactions with a first marketing asset of a first marketing campaign may be stored in a database. Thereafter, the database may be queried to determine whether the individual interacted with the first marketing asset in accordance with defined criteria. If so, the individual may be associated with the first marketing campaign.

33 Claims, 6 Drawing Sheets

U.S. PATENT DOCUMENTS

| | | | |
|---|---|---|---|
| 7,680,892 | B2 | 3/2010 | Knox et al. |
| 7,729,940 | B2 * | 6/2010 | Harvey et al. ............... 705/7.31 |
| 7,937,286 | B2 * | 5/2011 | Newman et al. ............ 705/7.31 |
| 2001/0020236 | A1 * | 9/2001 | Cannon ............................ 707/1 |
| 2002/0040387 | A1 | 4/2002 | Lessa et al. |
| 2002/0078191 | A1 | 6/2002 | Lorenz |
| 2005/0021396 | A1 | 1/2005 | Pearch et al. |
| 2006/0253486 | A1 | 11/2006 | Ford |
| 2007/0083417 | A1 | 4/2007 | Wagner et al. |
| 2007/0112614 | A1 | 5/2007 | Maga et al. |
| 2007/0112615 | A1 * | 5/2007 | Maga et al. ..................... 705/10 |
| 2007/0260519 | A1 * | 11/2007 | Sattley et al. ................... 705/14 |
| 2008/0065476 | A1 | 3/2008 | Klein et al. |
| 2008/0091516 | A1 * | 4/2008 | Giunta ............................ 705/10 |
| 2008/0097854 | A1 | 4/2008 | Young |
| 2008/0103909 | A1 * | 5/2008 | Huang et al. ................... 705/14 |
| 2008/0114641 | A1 | 5/2008 | Keenum |
| 2008/0162286 | A1 * | 7/2008 | Lieberman et al. ............ 705/14 |
| 2008/0215348 | A1 | 9/2008 | Guldimann et al. |
| 2008/0215418 | A1 | 9/2008 | Kolve et al. |
| 2008/0247534 | A1 * | 10/2008 | Steul ....................... 379/266.07 |
| 2008/0255944 | A1 | 10/2008 | Shah et al. |
| 2008/0313011 | A1 * | 12/2008 | Rose et al. ...................... 705/10 |
| 2009/0043623 | A1 * | 2/2009 | Blades et al. .................... 705/7 |

FOREIGN PATENT DOCUMENTS

| | | |
|---|---|---|
| WO | WO-00/34910 | 6/2000 |
| WO | WO-00/42747 A1 | 7/2000 |
| WO | WO-00/64118 A2 | 10/2000 |
| WO | WO-01/15196 A1 | 3/2001 |
| WO | WO-2006/009480 | 1/2006 |

OTHER PUBLICATIONS

PRWeb "New Eloqua Conversion Suite for Salesforce.com Achieves . . . " (Nov. 2004) (http://www.prweb.com/pdfdownload/174275.pdf).* b2bnews "Eloqua unveils its Conversion Suite" (May 2005) (http://www.b2bnews.org/b2b-news-005/050905-0114-b2b-news.html).*

Almeroth et al. "Multicast Group Behavior in the Internet's Multicast Backbone (MBone)" IEEE Communications Magazine, Jun. 1997, pp. 124-129.

B2B Marketing Automation Company Marketo Named as Finalist in 2008 American Business Awards[SM] [online] May 16, 2008 [retrieved on Nov. 9, 2012]. Retrieved from the Internet: <URL:http://www.marketo.com/about/news/press-releases/b2b-marketing-automation-company-marketo-named-as-finalist-in-2008-american-business-awards.php. 2 pages.

B2B Marketing Cheat Sheet—Lead Scoring, 2 pages.

B2B Marketing Company Marketo Announces Nine New Customers [online] Apr. 22, 2008 [retrieved on Nov. 9, 2012]. Retrieved from the Internet: <URL:http://www.marketo.com/about/news/press-releases/marketo-announces-nine-new-customers.php>. 2 pages.

B2B Marketing Vendor Marketo Honored as Presenter at Software 2008's Exclusive "Innovation Showcase" [online] Apr. 3, 2008 [retrieved on Nov. 9, 2012]. Retrieved from the Internet: <URL:http://www.marketo.com/about/news/press-releases/marketo-presents-at-software-2008-innovation-showcase.php>. 3 pages.

Berners-Lee "Universal Resource Identifiers in WWW" Network Working Group, Request for Comments: 1630, Jun. 1994, 28 pages.

Berners-Lee et al. "Uniform Resource Locators (URL)" Network Working Group, Request for Comments: 1738, Dec. 1994, 25 pages.

Berners-Lee and Connolly "Hypertext Markup Language 2.0" Network Working Group, Request for Comments: 1866, Nov. 1995, 77 pages.

Berners-Lee et al. "Hypertext Transfer Protocol—HTTP/1.0" Network Working Group, Request for Comments: 1945, May 1996, 60 pages.

Coldspark, Transforming Business One Email at a Time [online] Jan. 18, 2002 [retrieved on Nov. 9, 2012]. Retrieved from the Internet: <URL: http://web.archive.org/web/20020118031704/http://www.coldspark.com/>. 1 page.

Compatibility List, [online] www.iTraceYou.com, Oct. 31, 2001 [retrieved on Nov. 9, 2012] Retrieved from the Internet <URL:http://web.archive.org/web/20011031004618/http://www.itraceyou.com/cgi-bin/go.cgi?skel=compat&lang=EN>. 1 page.

Confirm.to [online] Feb. 15, 2001 [retrieved on Nov. 9, 2011]. Retrieved from the Internet: <URL: http://web.archive.org/web/20010215010803fw_/http://www.confirm.to/confirm.to/toc.html> 1 page.

Crocker "Standard for the Format of APRA Internet Text Messages" Request for Comments: 822, Aug. 13, 1982, 49 pages.

Eloqua Spring 2008 Release, Product Information Series—Eloqua Campaign Management, 2008, 9 pages.

Eloqua Spring 2008 Release, Product Information Series—Eloqua RSS Feeds, 2008, 3 pages.

Epidemic works with most e-mail [online] Apr. 7, 2000 [retrieved on Dec. 20, 2011]. Retrieved from the Internet <URL: http://web.archive.org/web/20000407223945/http://epidemic.com/the_facts/will_it_work.html;$sessionid$U45M0KIAAANCICQ>. 1 page.

Erale and Miller, Modern B2B Marketing Webinar How Vindicia Went From Zero to Lead Management Hero in Less Than One Day, May 8, 2008, 19 pages.

Evites Private Policy [online] Evite, Dec. 15, 2002 [retrieved on Nov. 9, 2012]. Retrieved from the Internet: <URL:http://web.archive.org/web/20021215221040/http://www.evite.com/html/popups/privacy.html>. 6 pages.

Fielding et al. "Hypertext Transfer Protocol—http/1.1" Network Working Group, Request for Comments: 2068, Jan. 1997, 162 pages.

Fielding et al. "Hypertext Transfer Protocol—HTTP/1.1" Network Working Group, Request for Comments: 2616, Jun. 1999, 176 pages.

Fundraising Techniques for the Future [online] Apr. 11, 2000 [retrieved on Dec. 20, 2011]. Retrieved from the Internet <URL:http://web.archive.org/web/20000411150833/http://www.epidemic.com/company_info/release/pr_004.html>. 2 pages.

Game-Changing B2B Marketing Software Unveiled by Marketo [online] Mar. 20, 2008 [retrieved on Nov. 9, 2012]. Retrieved from the Internet: <URL:http://www.marketo.com/about/news/press-releases/game-changing-b2b-marketing-software-unveiled-by-marketo.php>. 3 pages.

Get to Know iTraceYou.com [online] Oct. 31, 2001 [retrieved on Nov. 9, 2011] Retrieved from the Internet: <URL:http://web.archive.org/web/20011031004737/http://www.itraceyou.com/cgibin/go.cgi?skel=about&lang=EN>. 1 page.

Get to know WebTrace! [online] Aug. 14, 2001 [retrieved on Aug. 15, 2011] Retrieved from the Internet: <URL:http://web.archive.org/web/20010814011350/http://www.itraceyou.com/cgibin/go.cgi?skel=webtrace &lang=EN>. 1 page.

Internet Archive Wayback Machine Beta [online] 2001 [retrieved online Nov. 20, 2012]. Retrieved from the Internet: <URL: http://wayback.archive.org/web/20010901000000*/http://www.itraceyou.com>. 2 pages.

Jagannathan et al., "An Adaptive Pricing Scheme for Content Delivery Systems," Global Internet, San Antonio, Texas, USA, Nov. 2001.

Kristol and Montulli "HTTP State Management Mechanism" Network Working Group, Request for Comments: 2109, Feb. 1997, 21 pages.

Lead Management Firm Marketo Wins 2008 WizKids Award [online] Mar. 26, 2008 [retrieved on Nov. 9, 2012]. Retrieved from the Internet: <URL:http://www.marketo.com/about/news/press-releases/lead-management-firm-marketo-wins-2008-wizkids-award.php>. 2 pages.

Lead Management Firm Marketo Wins CRM Magazine Rising Star Award [online] Aug. 21, 2008 [retrieved on Nov. 9, 2012]. Retrieved from the Internet: <URL: http://www.marketo.com/about/news/press-releases/marketo-wins-crm-magazine-rising-star-award.php>. 2 pages.

Lead Management Software from B2B Marketing Firm Marketo to Automate Lead Nurturing and Scoring [online] Oct. 29, 2007 [retrieved on Nov. 9, 2012]. Retrieved from the Internet: <URL:http://www.marketo.com/about/news/press-releases/lead-management-software-from-marketo-to-automate-lead-nurturing-and-scoring.php>. 2 pages.

Learn how to use your TraceBox! [online] Feb. 13, 2002 [retrieved on Nov. 9, 2012] Retrieved from the Internet: <URL:http://web.archive.

org/web/20020213154541/http://www.itraceyou.com/cgibin/go. cgi?skel=tracebox&lang=EN>. 2 pages.

Lottor "Domain Administrators Operation Guide" Network Working Group, Request for Comments: 1033, Nov. 1987, 22 pages.

MacPherson, Everything You Need to Know: Permission-Based Email Marketing That Works! Chicago:Dearborn Trade, 2001, pp. 64-75, 104-129, and 180-189.

MailSpark Corporate Rich Media E-mail [online] Jan. 27, 2002 [retrieved on Nov. 9, 2012]. Retrieved from the Internet: <URL:http://web.archive.org/web/20020127152927/http://www.coldspark.com/solutions/mailspark/index.asp>. 1 page.

Marketo Lead Management, 2011, 2 pages.

Marketo "Ten Tips for Best Practice Lead Management", 2008, 20 pages.

Marketo Declares a Revenue Revolution [online] Jul. 14, 2008 [retrieved on Nov. 9, 2012]. Retrieved from the Internet: <URL:http://www.marketo.com/about/news/press-releases/marketo-declares-a-revenue-revolution.php>. 3 pages.

Marketo Lead Management Wins Demand Generation Program of the Year Award [online] Feb. 11, 2009 [retrieved on Nov. 9, 2012]. Retrieved from the Internet: <URL:http://www.marketo.com/about/news/press-releases/marketo-wins-demand-generation-program-of-the-year-award.php>. 2 pages.

Marketo Reinvents Marketing Automation (Again) with Launch of Marketo Lead Management 3.0 [online] Mar. 3, 2009 [retrieved on Nov. 9, 2012]. Retrieved from the Internet: <URL:http://www.marketo.com/about/news/press-releases/marketo-reinvents-marketing-automation-again.php>. 3 pages.

Marketo, "Are They Hot or Not? A guide to aligning sales and marketing by implementing lead scoring" 2008, 7 pages.

Marketo, "The Definitive Guide to Lead Scoring: A Marketo Workbook" 2010, 54 pages.

Mena, WebMining for Profit: E-Business Optimization. Boston:Digital Press, 2001, pp. 1-33, 123-145, and 212-213.

MessageMedia Announces UnityMail Version 4.0, [online] Nov. 8, 2000 [retrieved on Nov. 9, 2011]. Retrieved from the Internet: <URL:http://emailuniverse.com/list-news/?id=226&opt=print>. 1 page.

Miller, Jon. "Lead Management Will Never Be the Same Again." in B2B Marketing and Sales Blog [online] Mar. 20, 2008 [retrieved on Nov. 9, 2012]. Retrieved from the Internet: <URL: http://blog.marketo.com/blog/2008/03/lead-management.html>. 4 pages.

Mockapetris "Domain Names—Concepts and Facilities", Network Working Group, Request for Comments: 1034, Nov. 1987, 55 pages.

MindArrow Systems Releases Messenger for Outlook [online] Jun. 3, 2002 [retrieved on Nov. 20, 2012]. Retrieved from the Internet: <URL: http://www.thefreelibrary.com/MindArrow+Systems+Releases+Messenger+for+Outlook.-a086645035>. 5 pages.

Paxson, V., "End-to-End Routing Behavior in the Internet," Transactions on Networking, vol. 5, No. 5, pp. 601-615, Oct. 1997.

Personify Introduces Profit Platform [online] Jun. 26, 2000 [retrieved on Nov. 9, 2012]. Retrieved from the Internet: <URL:http://www2.prnewswire.com/cgi-bin/stories.pl?ACCT=104&STORY=/www/story/06-26-2000/0001251697&Edate=>. 4 pages.

Press Release, DoubleClick Inc., DoubleClick Releases DARTmail 4.0, Enhancing its Email Management Service [online] Oct. 22, 2003 [retrieved on Nov. 9, 2012]. Retrieved from the Internet: <URL:http://www.computerworld.com.au/article/56440/doubleclick_releases_dartmail_4_0_enhancing_its_email_management_service/>. 1 page.

Press Release, DoubleClick Inc., DoubleClick Unveils Email Strategy [online] Nov. 29, 1999 [retrieved on Nov. 9, 2012]. Retrieved from the Internet: <URL:http://ezineuniversity.com/news/1129dartmail.html >. 3 pages.

Press Release, iTraceYou.com, Every hour, Hundreds of emails are traced by iTraceYou.com, [online] Jul. 4, 2001 [retrieved on Nov. 9, 2012]. Retrieved from the Internet <URL:http://web.archive.org/web/20011121015936/http://www.itraceyou.com/media/en/pr-070401.html>. 2 pages.

Press Release, iTraceYou.com, International team releases first generic e-mail tracing system, [online] Dec. 15, 2000 [retrieved on Nov. 9, 2012]. Retrieved from the Internet: <URL:http://web.archive.org/web/20010907143207/http://www.itraceyou.com/media/en/pr-121509.html>. 2 pages.

Press Release, MindArrow Systems, MindArrow Systems Launches MindArrow Messenger Suite [online] Apr. 23, 2001 [retrieved on Aug. 18, 2011]. Retrieved from the Internet: <URL:http://web.archive.org/web/20011216022808/http://www.mindarrow.com/company/news/press.asp?prID=63>. 2 pages.

Resnick "Internet Message Format" Network Working Group, Request for Comments: 2822, Apr. 2001, 51 pages.

Resnick "Internet Message Format" Network Working Group, Request for Comments: 5322, Oct. 2008, 57 pages.

Rich Media E-mail Marketing, [online] Jun. 5, 2002 [retrieved on Nov. 9, 2012]. Retrieved from the Internet: <URL:http://web.archive.org/web/20020605082413/http://coldspark.com/solutions/index.asp>. 2 pages.

Send read-receipt requested e-mail from your e-mail s/w or web-mail service [online], Apr. 7, 2000 [retrieved on Nov. 9, 2012]. Retrieved from the Internet: <URL:http://web.archive.org/web/20000407195303_/http://www.confirm.to/confirm.to/main.html>. 2 pages.

Smith, *FAQ: Web Bugs, Privacy Foundation*, [online] Privacy Foundation, Apr. 8, 2001, [retrieved on Aug. 8, 2011]. Retrieved from the Internet: <URL: http://web.archive.org/web/20010408071804/http://www.privacyfoundation.org/resources/webbug.asp>. 7 pages.

Smith, *The Cookie Leak Security Hole in HTML Email Messages*, [online]. Computerbytesman, Nov. 30, 1999 [retrieved on Aug. 8, 2011]. Retrieved from the Internet <URL:http://www.computerbytesman.com/privacy.cookleak.htm>. 3 pages.

The Advanced feature of Confirm.To, [online] Mar. 2, 2001 [retrieved on Nov. 9, 2012]. Retrieved from the Internet: <URL:http://web.archive.org/web/20010302020144/http://www.confirm.to/ confirm.to/adv.html>. 3 pages.

UnityMail Tip of the Week, Adding a Trackable URL, [online] May 31, 2000 [retrieved on Nov. 9, 2012]. Retrieved from the Internet: <URL:http://web.archive.org/web/20010413085827/http://www.messagemedia.com/techsupt/tips/adding_trackable_url.htm>. 1 page.

UnityMail Tip of the Week, Industry Terms [online] May 31, 2000 [retrieved on: Nov. 9, 2012]. Retrieved from the Internet: <URL:http://web.archive.org/web/20010413090245/http://www.messagemedia.com/techsupt/tips/industry_terms.htm>. 2 pages.

UnityMail Tip of the Week, Tracking URLS Within a Image [online] May 3, 2000 [retrieved on Nov. 9, 2012]. Retrieved from the Internet: <URL:http://web.archive.org/web/20010427131006/http://www.messagemedia.com/techsupt/tips/may_3.htm>. 1 page.

UnityMail Tip of the Week, Viewing URL Activity [online] May 31, 2000 [retrieved on Nov. 9, 2012]. Retrieved from the Internet <URL:http://web.archive.org/web/20010427195004/http://www.messagemedia.com/techsupt/tips/viewing_url_activity.htm>. 1 page.

Welcome to iTraceYou.com [online] Aug. 2, 2001 [retrieved on Nov. 9, 2012] Retrieved from the Internet: <URL:http://web.archive.org/web/20010802101003/http://www.itraceyou.com/cgi-bin/go.cgi?skel=index&lang=EN>. 1 page.

U.S. Appl. No. 60/199,355, System and Method Related to Generating and Tracking an Email Campaign, by: Fougler, Chipperfield, Cooper and Storms, filed Apr. 25, 2000.

U.S. Appl. No. 60/228,382, Method and Apparatus for Content Rich Bulk Email Services, by: Brown, filed Aug. 28, 2000.

U.S. Appl. No. 60/236,530, Method that enables the sender of an e-mail message to receive a confirmation receipt as soon as the addressee receives and opens that message, independently of mail-client applications and/or operational systems that are used in the process, by: Lessa and Machado, filed Sep. 29, 2000.

U.S. Appl. No. 60/333,287, Method and Apparatus for Monitoring the Email and Website Behavior of an Email Recipient, by: Knox and Knox, filed Nov. 6, 2001.

Coldspark, Transforming Business one e-mail at a time [online] Nov. 28, 2001 [retrieved on Dec. 11, 2011]. Retrieved from the Internet: <URL: http://web.archive.org/web/20011128163701/http://www.coldspark.com>. 2 pages.

Coldspark, [online] Nov. 20, 2001, [retrieved on Jan. 12, 2012]. Retrieved from the Internet <URL: http://web.archive.org/web/20011120053925/http://www.coldspark.com/about/index.asp>. 1 page.

Eloqua, Accelerating Demand Generation with Codynamic Lead Scoring, 2009, 17 pages.

Eloqua, Automating Demand Generation, Codynamic Lead Scoring, Feb. 22, 2007, 17 pages.

Eloqua Best Practice, Codynamic Lead Scoring Template, Step by Step Instructions, Jul. 17, 2009, 26 pages.

Eloqua, Lead Management Methodology, 2006, 23 pages.

Eloqua, Research Report, Accelerating Demand Generation with Codynamic Lead Scoring, 2009, 14 pages.

iTraceYou.com Compatibility List [online] Aug. 7, 2001 [retrieved on Aug. 29, 2011]. Retrieved from the Internet <URL: http://web.archive.org/web/20010807223605/http://www.itraceyou.com/cgibin/go.cgi?skel=compat&lang=EN>. 1 page.

MessageMedia, UnityMail Administrators Guide, Version 5.0, 2001, 180 pages.

MessageMedia, UnityMail User's Guide, Version 5.0, 2001, 226 pages.

Mosher, Microsoft Outlook Programming, Digital Press, 2003, pp. 59-60, 64-65, 191-194, and 197-198.

Reed, MessageMedia, Viral Marketing Workflow for UnityMail, Mar. 9, 2001, 6 pages.

Rizzo, Programming Microsoft Outlook and Microsoft Exchange, 2d ed. Microsoft Press 2000, pp. 3-5, 138-139, 144-145, and 260-262.

Woods, "Digital Body Language", New Year Publishing LLC, 2009, 220 pages.

* cited by examiner

SYSTEMS, METHODS, AND APPARATUS FOR ANALYZING THE INFLUENCE OF MARKETING ASSETS

CROSS-REFERENCE TO RELATED APPLICATION

This application claims priority to and the benefit of, and incorporates herein by reference in its entirety, U.S. Provisional Patent Application No. 61/046,220, which was filed on Apr. 18, 2008.

TECHNICAL FIELD

The present invention relates, in various embodiments, to systems, methods, and apparatus that execute operations and track results to produce reporting and analytics for end-users. More specifically, described herein are exemplary systems, methods, and apparatus that track an individual's interactions with marketing assets and that then analyze the influence of those marketing assets upon the individual.

BACKGROUND

In bringing a product or products to market, a marketing department in an organization will typically produce several different marketing campaigns. Each campaign may involve a separate marketing effort, such as web site promotion, electronic mail promotion, print mail promotion (i.e., a promotional mailing physically sent using a postal service, rather than electronically sent over a computer network), a web-based event, or a live event. The marketing function in an organization has, however, traditionally lacked systems and tools to effectively track the results and effects of such marketing efforts on corporate revenues.

For example, a typical marketing strategy involves selecting a particular group of individuals based on demographics, or other characteristics, and then targeting that group with a marketing campaign (e.g., a mass mailing of electronic or print mail, a calling campaign, etc.). In the past, a marketing department would typically keep a list of the individuals targeted by the campaign, and, if one of those individuals eventually purchased the product(s) being marketed, the marketing department would credit that sale to the marketing campaign.

Such a crude approach to assessing the effectiveness of a marketing campaign is, however, of limited value. It does not, for example, provide any insight into whether the individual was, in fact, influenced by the campaign, or to what extent. For example, the print mail of a mailing campaign may have been discarded by another before reaching the targeted individual, the electronic mail of a mailing campaign may have been deleted by the targeted individual without being opened, and/or a targeted individual may have never listened to, or simply deleted, a voice message left for him or her in a calling campaign. The reason for the individual's purchase may, therefore, be unrelated to the marketing campaign.

As such, systems, methods, and apparatus that provide further insight into the effectiveness of a marketing campaign are needed.

SUMMARY OF THE INVENTION

Described herein are various embodiments of systems, methods, and apparatus that analyze the effectiveness of marketing campaigns. In particular, whether the marketing assets associated with a particular marketing campaign (e.g., an e-mail, a print-mail, a calling campaign, a web form, a landing page on a website, an online event, a survey, a tradeshow, etc.) influenced an individual and contributed to his or her purchasing decision is determined. In this way, a deeper insight into the effectiveness of the campaign may be determined.

For example, an e-mail associated with a campaign may be determined to have influenced an individual's purchasing decision only if the e-mail was opened, or only if certain links in the e-mail were accessed (i.e., "clicked" on). Similarly, a print-mail associated with a campaign may be determined to have influenced an individual only if the individual took some further action in response to receiving the print-mail—e.g., visiting a website, or calling a telephone number, identified on the print-mail in order to receive further information. In various embodiments, as described further below, the threshold at which the individual is determined to have been influenced by the marketing asset is user-selectable and/or user-definable.

As described further herein, in order to determine the influence of marketing assets upon a targeted individual, the individual's interactions with the marketing assets are first tracked and stored, for example in one or more databases, for later access. Such tracking later permits queries to be executed on the data store(s) in order to determine whether the targeted individual should be associated with a particular marketing campaign. In addition, the individual may be lead scored and ranked based on his or her activities, and revenue from the sales of marketed products may be more accurately and wisely attributed to particular marketing campaigns when it is known whether the individual who purchased a product was in fact influenced by the campaign.

In general, in one aspect, embodiments of the invention feature a method for analyzing the influence of marketing assets. In accordance with the method, a record of an individual's interactions with a first marketing asset of a first marketing campaign is stored in a database. Later, the database may be queried to determine whether the individual interacted with the first marketing asset in accordance with defined criteria. If so, the individual may be associated, in computer memory, with the first marketing campaign.

In general, in another aspect, a system that analyzes the influence of marketing assets may include i) a database that stores a record of an individual's interactions with a first marketing asset of a first marketing campaign, ii) a determination module that queries the database to determine whether the individual interacted with the first marketing asset in accordance with defined criteria, and iii) an association module that associates, in computer memory, the individual with the first marketing campaign. The association module may be configured such that the association of the individual with the first marketing campaign only occurs upon a determination that the individual interacted with the first marketing asset in accordance with the defined criteria.

In general, in yet another aspect, embodiments of the invention feature an article of manufacture that stores computer-readable instructions thereon for analyzing the influence of marketing assets on an individual. The article of manufacture may include, for example, instructions that track the individual's interactions with a first marketing asset of a first marketing campaign and that transmit a record of the interactions to a database for storage thereat. In addition, the article of manufacture may include instructions that query the database to determine whether the individual interacted with the first marketing asset in accordance with defined criteria, and instructions that associate, in computer memory if the individual interacted with the first marketing asset in accordance with the defined criteria, the individual with the first marketing campaign.

Various embodiments of the foregoing methods and systems may include the following features, or modules/hardware for implementing the following features, while various embodiments of the foregoing articles of manufacture may store computer-readable instructions thereon for implementing the following features. A record of the individual's interactions with a plurality of additional marketing assets (i.e., those beyond the first marketing asset) may also be stored in the database. At least one score may then be assigned to the individual, and stored in computer memory, based upon the individual's interactions with the first marketing asset and the plurality of additional marketing assets. The individual may then be ranked based upon his or her assigned score, and his or her rank stored in the computer memory. In addition, if the individual's score, which may represent the individual's level of interest in a product, exceeds a threshold, he or she may be identified to a sales group.

In one embodiment, a plurality of scores are assigned to the individual over time and a plurality of ranks for the individual are stored in the computer memory over time. Each such rank may be associated with a particular time frame. Then, a change in the individual's rank from a first time frame to a second time frame may be identified, and it may be determined whether the change in the individual's rank occurred within a set time period from a beginning of the first marketing campaign.

In another embodiment, a score is assigned, and stored in the computer memory, to each of a plurality of additional persons (i.e., other than the individual) based upon each such person's interactions with the first marketing asset and the plurality of additional marketing assets. Moreover, each such person may be ranked based upon his or her assigned score, and those ranks stored in the computer memory. A graphical representation of the ranks of each individual and person associated with the first marketing campaign may then be presented.

In yet another embodiment, the database is queried to determine, based upon the individual's interactions with the first marketing asset and the plurality of additional marketing assets, a stage at which the individual is at in a buying cycle (e.g., early-stage education, middle-stage decision making, late-stage buying, etc.).

In one embodiment, in accordance with the exemplary methods, systems, and articles of manufacture described herein, the individual is in fact associated, in the computer memory, with a plurality of marketing campaigns. In such a case, revenue generated from a sale to the individual may be attributed across the plurality of campaigns. Such attribution may occur, for example, in accordance with user (e.g., marketer) input. More specifically, a marketer may direct that the revenue be automatically allocated (i.e., by default) across the multiple campaigns in a defined manner (e.g., all revenue to the first campaign with which the individual was associated; all revenue to the last campaign with which the individual was associated; evenly across all campaigns with which the individual was associated; 30% of the revenue to the first campaign with which the individual was associated, 50% of the revenue to the last campaign with which the individual was associated, and the remaining 20% of the revenue evenly across the rest of the campaigns with which the individual was associated; etc.) and/or that the revenue be automatically rebalanced each time the individual is associated with a new campaign. Alternatively, the marketer may be prompted to manually allocate the revenue across the campaigns (e.g., by manually inputting percentages for each campaign into a user interface) each time he or she wishes to analyze the success of the campaigns.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

In general, in various embodiments, the present invention pertains to systems, methods, and apparatus for analyzing the influence of marketing assets. In broad overview, in accordance with one embodiment of the invention, a marketing department within an organization may develop one or more marketing campaigns to market a product, and distribute one or more marketing assets to targeted individuals in carrying out each such campaign. Generally, a marketing asset is anything with a physical or digital presence whose purpose is to market an organization's product. For example, a marketing asset may be an e-mail, a print-mail, a calling campaign with a script, a web form, a landing page on a website, an online event (such as a webinar), a survey, a tradeshow, or any other means for interacting with a potential customer.

The marketing organization, or another entity on its behalf, may then track the targeted individuals' interactions with the marketing assets. For example, each recipient of an e-mail may have his or her interactions with the e-mail (e.g., an opening of the e-mail, a selection of a link in the e-mail, etc.) tracked. Such interactions may be stored in a database for later analysis. In particular, the interactions may be analyzed to determine whether an individual interacts with a particular marketing asset of a marketing campaign in accordance with defined criteria. If so, the individual is flagged as having been influenced by the marketing campaign. The interactions may also be analyzed to develop a lead score for each targeted individual, and each individual may be ranked according to his lead score. The analysis of such interactions may be combined and presented to a marketer (e.g., in graphical format on a computer screen) and employed in attributing revenue, generated from product sales, across the various marketing campaigns.

Figure 1:
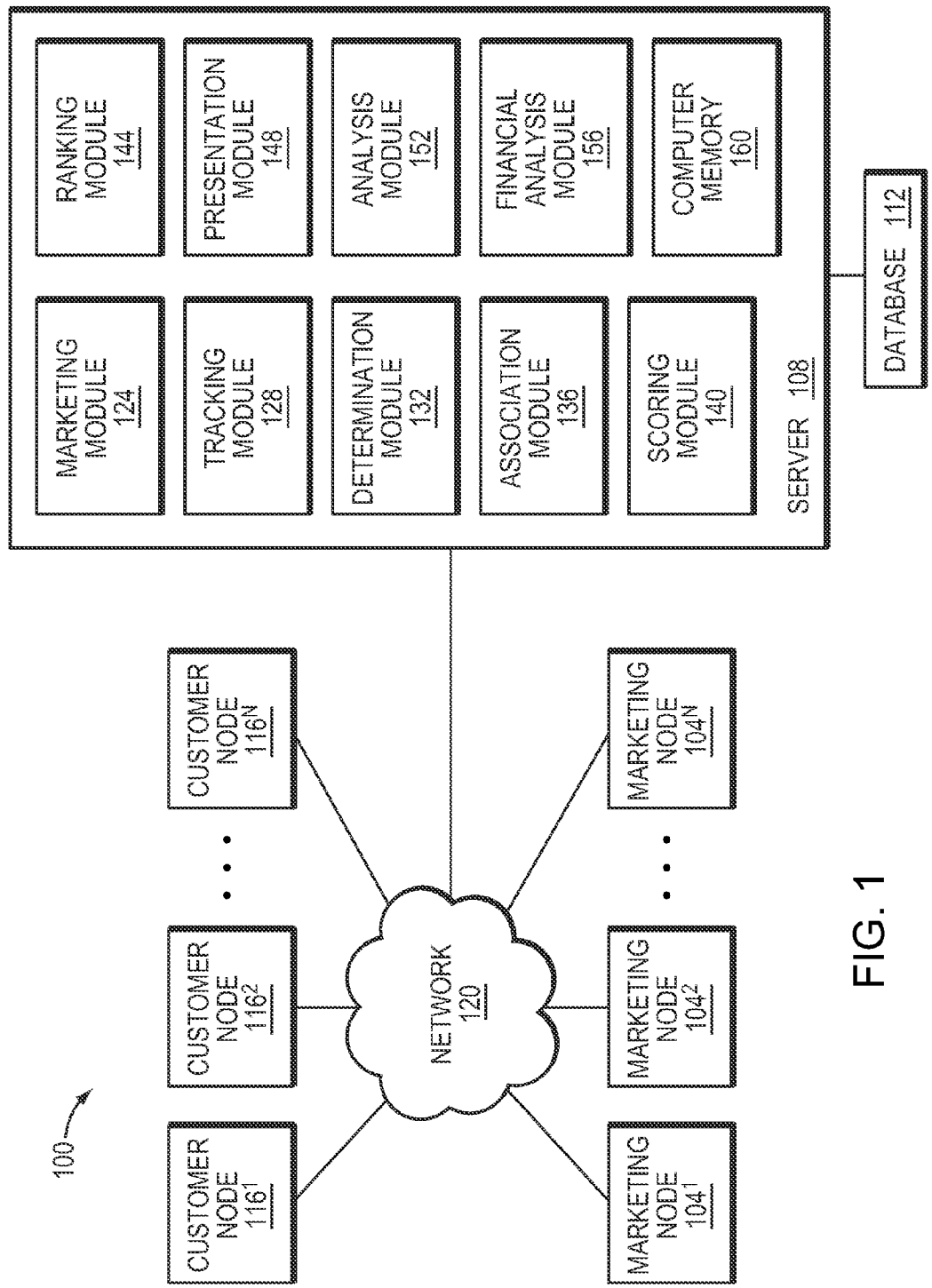
FIG. 1 is a block diagram of an illustrative embodiment of a system for analyzing the influence of marketing assets in accordance with the invention.

FIG. 1 depicts a system 100 for analyzing the influence of marketing assets according to an illustrative embodiment of this aspect of the invention. The system 100 includes at least one marketing node 104 (for example, a plurality of marketing nodes 1041-104N), a server node 108, a database 112, at least one customer node 116 (for example, a plurality of customer nodes $116^1$-$116^N$), and a network 120 that enables communication between a marketing node 104, the server node 108, and a customer node 116. As illustrated, the server node 108 may include a marketing module 124, a tracking module 128, a determination module 132, an association module 136, a scoring module 140, a ranking module 144, a presentation module 148, an analysis module 152, a financial analysis module 156, and computer memory 160.

The network 120 may be, for example, a local-area network (LAN), a metropolitan area network (MAN), or a wide area network (WAN), such as the Internet. Each of the marketing, server, and customer nodes 104, 108, 116 may be connected to the network 120 through a variety of connections including, but not limited to, standard telephone lines, LAN or WAN links (e.g., T1, T3, 56 kb, X.25), broadband connections (e.g., ISDN, Frame Relay, ATM), or wireless connections. The connections, moreover, may be established using a variety of communication protocols (e.g., HTTP, TCP/IP, IPX, SPX, NetBIOS, NetBEUI, SMB, Ethernet, ARCNET, Fiber Distributed Data Interface (FDDI), RS232, IEEE 802.11, IEEE 802.11a, IEEE 802.11b, IEEE 802.11g, and direct asynchronous connections).

Each marketing node 104 and customer node 116 may be any type of personal computer, Windows-based terminal, network computer, wireless device, information appliance, RISC Power PC, X-device, workstation, mini computer, main frame computer, personal digital assistant, set top box, hand-held device, or other computing device that is capable of both presenting information/data to, and receiving commands from, a user of the node 104, 116. Each of the marketing and customer nodes 104, 116 may include, for example, a visual display device (e.g., a computer monitor), a data entry device (e.g., a keyboard), persistent and/or volatile storage (e.g., computer memory), a processor, and a mouse. In one embodiment, each marketing and customer node 104, 116 includes a web browser, such as, for example, the INTERNET EXPLORER program developed by Microsoft Corporation of Redmond, Wash., to connect to the World Wide Web. In general, each marketing node 104 represents a computing device with which a marketer interacts in order to market a product in accordance with the illustrative embodiments described herein, while each customer node 116 represents a computing device with which a potential customer targeted by a marketer 104 interacts.

For its part, the server node 108 may be any computing device that is capable of receiving information/data from and delivering information/data to a marketer 104 and/or customer 116, for example over the network 120, and that is capable of querying, receiving information/data from, and delivering information/data to the database 112. The server node 108 may include a processor and persistent and/or volatile storage, such as the illustrated computer memory 160. The database 112 may be any computing device (or component of the server node 108) that is capable of receiving commands/queries and information/data from, and delivering information/data to, the server node 108. In one embodiment, the database 112 stores and manages collections of data. The database 112 may communicate using SQL or another language, or may use other techniques to store and receive data.

The computer memory 160 and the database 112 are described hereinbelow as storing and managing certain collections of data. However, as will be understood by one of ordinary skill in the art, the data described as being stored to or retrieved from the computer memory 160 may in fact, or in alternative embodiments, be stored to or retrieved from the database 112, and vice-versa.

The marketing module 124, tracking module 128, determination module 132, association module 136, scoring module 140, ranking module 144, presentation module 148, analysis module 152, and financial analysis module 156 of the server node 108 may each be implemented as any software program and/or hardware device, for example an application specific integrated circuit (ASIC) or a field programmable gate array (FPGA), that is capable of providing the functionality described below. It will be understood by one having ordinary skill in the art that the illustrated modules and organization are conceptual, rather than explicit, requirements. For example, any two or more of the illustrated modules (e.g., the scoring module 140 and the ranking module 144) may be combined into a single module, such that the functions performed by the two or more modules, as described below, are in fact performed by the single module. In addition, it should be understood that any single one of the illustrated modules may in fact be implemented as multiple modules, such that the functions performed by the single module, as described below, are in fact performed by the multiple modules. For its part, the computer memory 160 may be any hardware device, or software module with a hardware interface, that is capable of storing information, such as associations generated by the association module 136, in accordance with the invention.

Each of the server node 108 and database 112, and each marketing and customer node 104, 116, may also include one or more transceivers (or separate receivers and transmitters) that are capable of receiving and transmitting communications, including requests, responses, and commands, such as, for example, inter-processor communications and networked communications. Each transceiver, receiver, or transmitter, as the case may be, may be any hardware device, or software module with a hardware interface.

It will be understood by those skilled in the art that FIG. 1 is a simplified illustration of the system 100 and that it is depicted as such to facilitate the explanation of the present invention's embodiments. Moreover, the system 100 may be modified in of a variety of manners without departing from the spirit and scope of the invention. For example, rather than all being implemented on a single server node 108, one or more of the illustrated modules may be implemented on one or more other computing devices (not shown) and communicate with the server node 108 and/or database 112 directly, over the network 120, or over another additional network (not shown). In addition, the collections of data stored and managed by the database 112 may in fact be stored and managed by multiple databases (not shown), or the functionality of the database 112 may in fact be resident on the server node 108. In yet another example, the server node 108 and the database 112 may be local to a marketing node 104 and they may communicate directly with the marketing node 104 without the use of the network 116. Alternatively, the functionality of the database 112 and the modules shown as being implemented on the server node 108 may in fact be implemented on each marketing node 104, or a select number thereof. As such, the depiction of the system 100 in FIG. 1 is non-limiting.

In one illustrative embodiment, each marketing node 104 includes a web-based user-interface that enables its users (e.g., marketers) to access the functionality of the server node 108 through an internet browser with no local client installation requirements. For example, the functionality of the server node 108 may be provided through a subscription-based service, where each marketer 104 is given a username and password in order to access the server 108. The server node 108 may implement functional and object-oriented code components, application services, and database processing scripts to provide software as a service to each marketing node 104, logical processing, and interaction with the transactional database 112 for storage of user configurations and settings, as well as historical marketing data. The system 100 may be a multi-tenant, multi-schema architecture where common hardware and infrastructure is shared among tenants (e.g., marketers 104), but where individual tenant data is isolated, in one or more separate physical databases 112 or in one or more separate physical portions of a single database 112, from other tenant data.

As described below, the multi-tenant system 100 may enable the creation and storage of digital marketing collateral, the execution of outbound marketing efforts such as permission-based electronic mail promotion, and the tracking of inbound prospect behavior through, for example, tagged web page/cookie tracking and the analysis of web site forms (e.g., in bound RFI, surveys, etc.). In one embodiment, the system 100 implements functions and methods that tie the outbound marketing efforts of marketers 104 and the inbound tracking data of potential customers 116 to specific contacts defined in the system database 112. Data processing algorithms and analytical functions may enable marketers 104 to leverage this data to produce targeted and tracked marketing initiatives to potential customers 116.

Figure 2A:
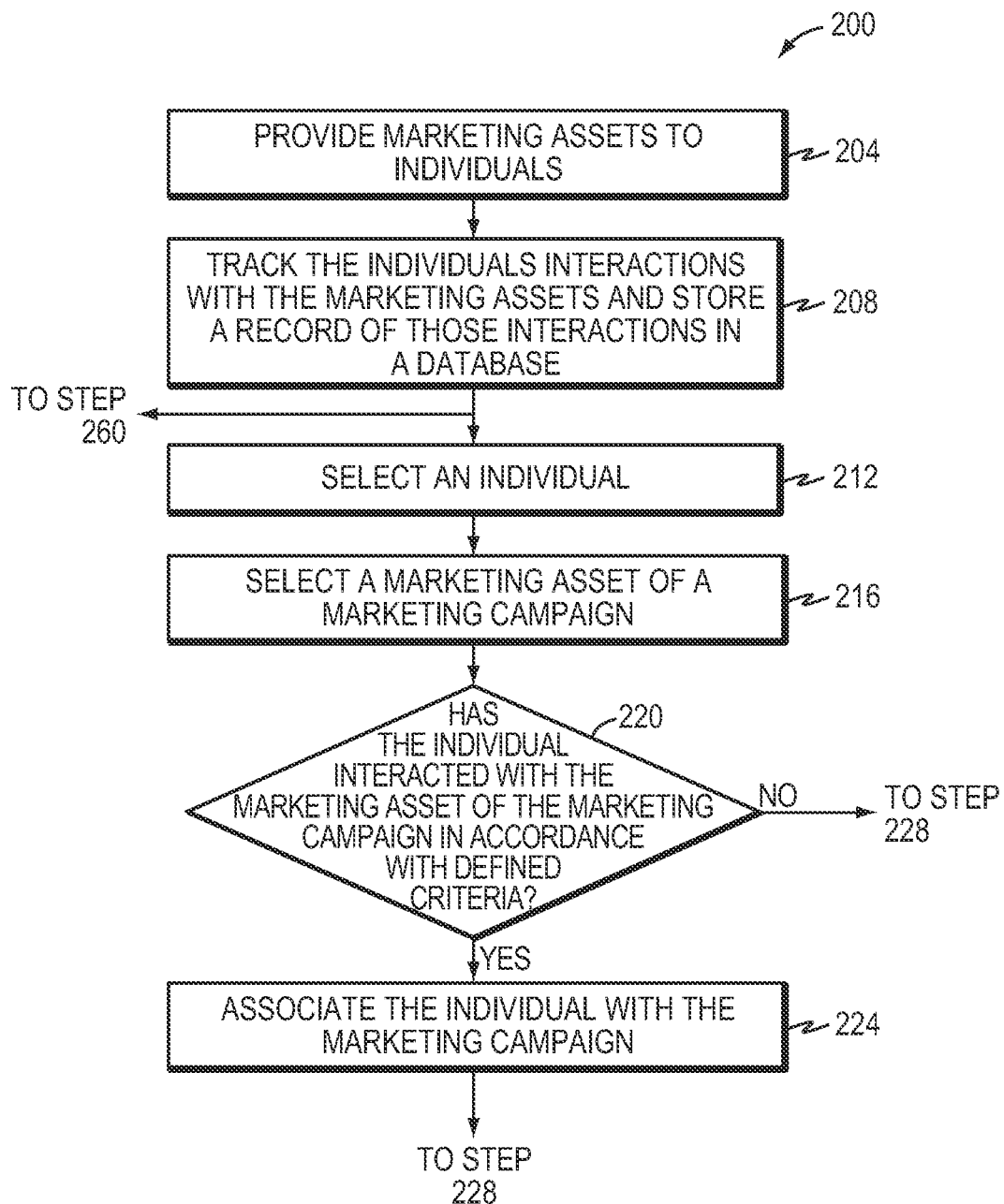
FIGS. 2A, 2B, and 2C are flow diagrams of an illustrative embodiment of a method for analyzing the influence of marketing assets in accordance with the invention.
Figure 2B:
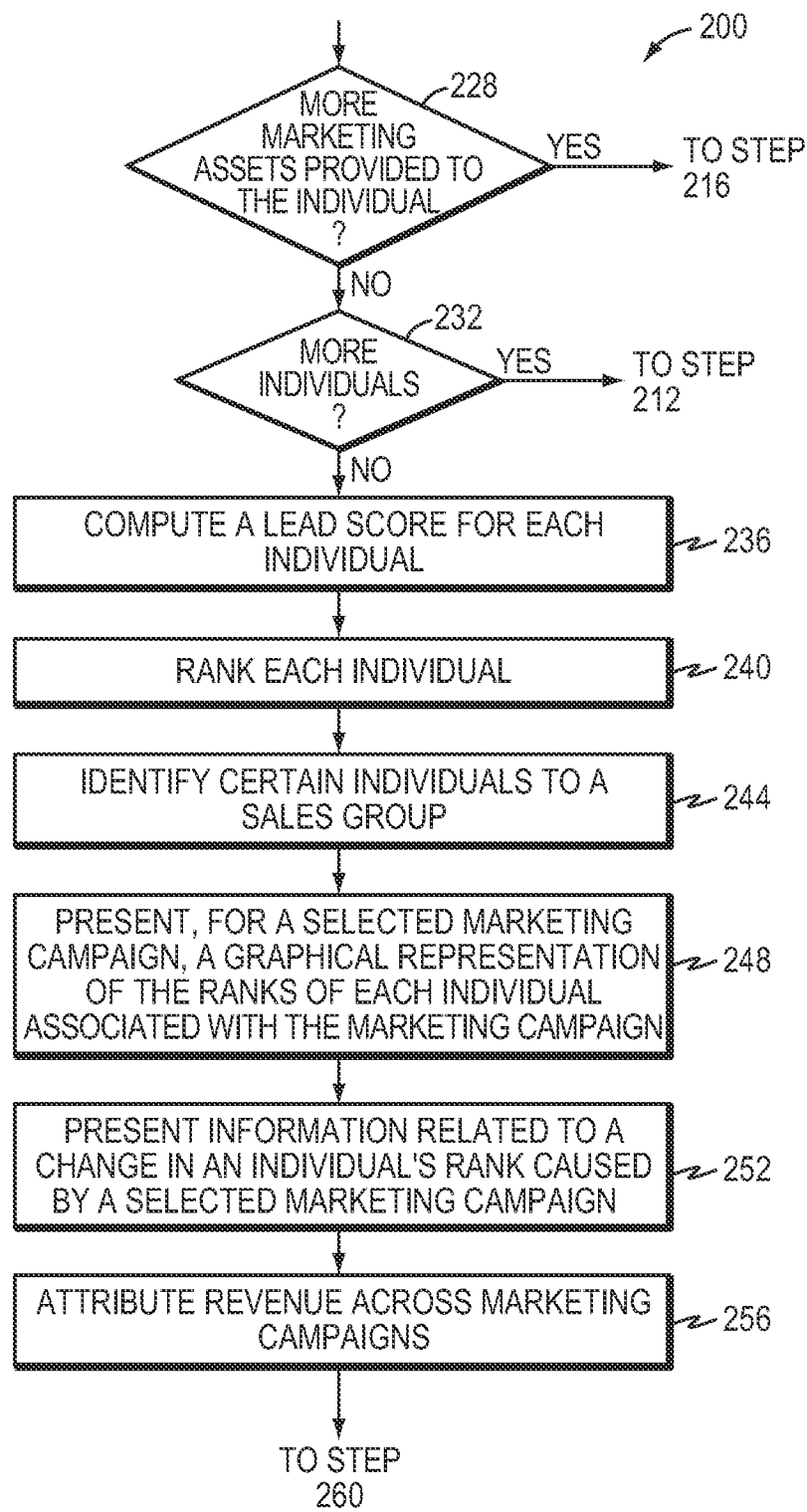
Figure 2C:
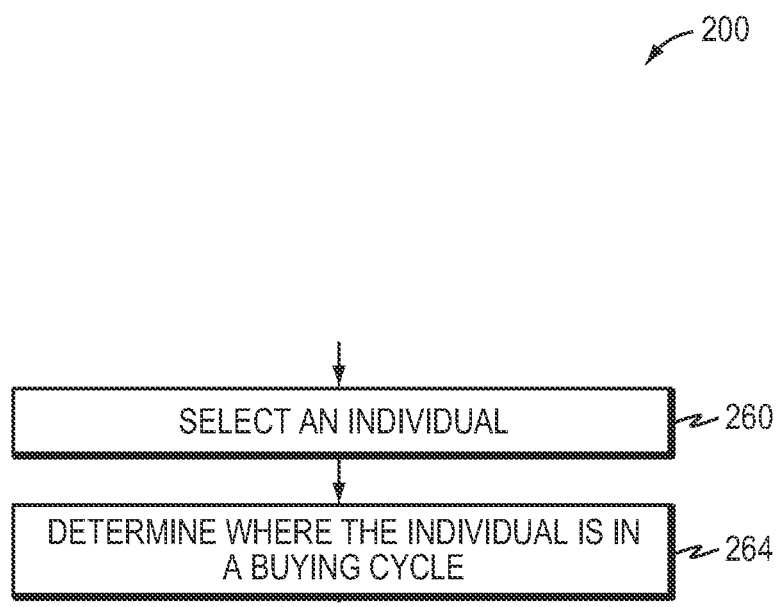

With reference now to FIGS. 2A-2C, in one illustrative embodiment of a method 200 for analyzing the influence of marketing assets, for example using the system 100 of FIG. 1, individuals' (e.g., potential customers') 116 interactions with marketing assets of various marketing campaigns are tracked and records thereof are stored in the database 112 at step 208. Then, at steps 212, 216, and 220, the database 112 is queried to determine whether a select individual interacted with a given marketing asset of a given marketing campaign in accordance with defined criteria, and, if so, that individual is associated, in the computer memory 160 at step 224, with that marketing campaign. Optionally, prior to step 208, marketing assets may be provided to individuals 116 (step 204) and, following step 224, a lead score may be computed for each individual 116 (step 236), each individual 116 may be ranked (step 240), certain individuals 116 may be identified to a sales group (step 244), a graphical representation of the ranks of each individual 116 associated with a given marketing campaign (step 248) and information related to a change in an individual's 116 rank (step 252) may be presented to a marketer 104, and revenue may be attributed across marketing campaigns (step 256). In addition, the method 200 may also optionally involve determining, at step 264, where an individual 116 is at in a buying cycle.

It will be understood that while the steps of the method 200 are described herein as occurring in series and in the order presented, certain steps may in fact occur in a different order or be executed in parallel with other steps. For example, the lead scoring step 236 and lead ranking step 240 may in fact occur at some point after the individuals' interactions have been tracked at step 208, but prior to steps 212-232. Alternatively, the lead scoring step 236 and lead ranking step 240 may occur in parallel with steps 212-232. As such, the particular flow indicated for the method 200 in FIGS. 2A-2C is non-limiting.

In addition, the steps of the method 200 are described as occurring for a particular marketer 104. However, given the aforedescribed multi-tenant architecture of the system 100, processing may in fact occur in parallel across one or more servers 108 and databases 112 for two or marketers 104, such that the two or more marketers 104 may in fact be executing method 200 at the same time.

In greater detail, and with reference to FIGS. 1 and 2A-2C, the marketing module 124 of the server node 108 may be employed in providing, at step 204, online (i.e., over the network 120) marketing assets to individuals 116. In addition, as described herein, the marketing module 124 may also facilitate, at step 204, the provision of offline (i.e., other than over the network 120, such as through the physical mail) marketing assets to the individuals 116. Either case is generally referred to herein as the provision of marketing assets by the marketing module 124. The marketing assets provided at step 204 may be "standard" assets that the server 108 recognizes by default, or "customized" assets that are created by a marketer 104 and that may be logically recognized and managed by the server 108. Exemplary "standard" assets include an e-mail, a print-mail, a scripted call in a calling campaign, a web form, and a landing page on a website, while "customized" assets may include an online event (such as a webinar), a survey, and a tradeshow. An exemplary online marketing asset is an e-mail, while an exemplary offline marketing asset is a print-mail or a tradeshow. In one embodiment, in order to enable the provision of marketing assets at step 204, the database 112 stores contact information for each potential customer 116, such as an e-mail addresses, a mailing addresses, and/or a telephone number. Such contact information may be provided (e.g., uploaded) by each marketer 104 to the server 108, and stored by the server 108 in separate physical databases 112, or in separate portions of a single database 112, for each such marketer 104. In such a fashion, each marketer 104 may be prevented from accessing another marketer's contact information.

In one embodiment, the marketing module 124 is employed in providing marketing assets to the individuals 116 upon command. For example, a marketer 104 may command the marketing module 124 to send a batch of e-mails to a selected number of potential customers 116, to provide a list of potential customers' telephone numbers to a calling center (which may be implemented either by a third party or internally by another department in the marketer's organization) to commence a scripted calling campaign, or to distribute a survey to a select number of customers 116. In another embodiment, the marketing module 124 implements an automated workflow engine that takes action upon the happening of certain events. For example, a marketer 104 may employ the marketing module 124 to construct rules, flowcharts, and/or similar constructs. Certain rules or steps in the flowchart may trigger the provision of certain marketing assets. For example, the marketer 104 may be hosting a tradeshow or an online event, such as a webinar. Then, the marketing module 124 may be configured to automatically send at a specified time (e.g., 2 weeks prior to the tradeshow or online event, 5 days prior to the tradeshow or online event, etc.) e-mails to potential customers 116 reminding them of the tradeshow or online event and/or providing them with other information. As still another example, the manner in which potential customers 116 interact with certain marketing assets may automatically trigger the provision by the marketing module 124 of additional marketing assets (i.e., activity-driven content) to those potential customer 116. To illustrate, the manner in which a potential customer 116 interacts with a landing page on the marketer's website (e.g., the links accessed, the searches conducted, etc.), or the answers provided by a potential customer 116 on a web form, may be tracked, as further described below, by the tracking module 128, and, if they are found to meet certain criteria, the marketing module 124 may trigger, for example, a piece of print mail (e.g., a pamphlet providing additional marketing information) to be sent to that potential customer 116. Using the marketing module 124, the marketer 104 may custom define any combination of what marketing assets to provide, when to provide them, and to whom they should be provided.

In one embodiment, each marketing asset provided online by the marketing module 124 (e.g., an e-mail) or otherwise provided offline by the marketer 104 (e.g., a tradeshow) is associated with a particular marketing campaign. As such, for each marketing asset provided, the marketing module 124 may cause to be stored in the database 112 a record that identifies the campaign with which the marketing asset is associated and the individual 116 to whom the marketing asset was provided. This enables marketers 104 to associate all online and offline efforts (and hence costs) to a specific marketing campaign.

As potential customers 116 interact with the marketing assets that they were provided, the tracking module 128 may be employed, at step 208, to track those interactions and to store a record of those interactions in the database 112. For example, as will be understood by one of ordinary skill in the art, the tracking module 128 may track whether and when an e-mail was received by an individual 116 (e.g., by way of a delivery receipt), whether and when the e-mail was opened by the individual 116 (e.g., by way of a read receipt), whether and when certain content within the e-mail (e.g., a hyperlink to a website of a marketer 104) was accessed by the individual 116 (e.g., by way of a cookie stored on the individual's computing device 116), whether the individual 116 pressed certain buttons on his or her telephone or uttered certain voice commands in response to an automated script executed in accordance with an automated calling campaign (e.g., by DTMF or voice recognition software), what links an individual 116 accessed on a landing page of a marketer's website and what searches he or she conducted thereon (e.g., by way of a cookie stored on the individual's computing device 116 and by tracking the individual's click-throughs and searches), and how an individual interacted with an online event, such as a webinar (e.g., by having the individual identify himself at the beginning of the webinar and then tracking the individual's responses to voting questions, etc. throughout the webinar). In addition, the tracking module 128 may scrutinize a web form, or an online survey, that identifies the individual 116 in some manner to analyze and track his or her responses thereto. The mere fact that the web form or survey was submitted by the individual 116 may also be tracked. As another example, a print-mail may provide a telephone number for a targeted individual 116 to call or a website for the targeted individual 116 to visit for more information. In such a case, the tracking module 128 may track whether the individual 116 calls the number or visits the website (e.g., by prompting the individual 116 to enter a code provided in the print-mail, by recognizing the individual's telephone number or a cookie on his or her computing device 116, etc.), and, if so, how the individual 116 interacts with an automated script played over the telephone or with the website he or she visits (e.g., by employing any of the exemplary techniques mentioned above, or others). As yet another example, whether a potential customer 116 attended a tradeshow, came to a marketer's tradeshow booth, participated in a demonstration conducted by the marketer 104 at the marketer's tradeshow booth, etc., may be collected (e.g., through a bar code or magnetic strip scan of an individual's trade show pass) and subsequently uploaded by the marketer 104 to the database 112 using the tracking module 128. This manual upload of data may be facilitated by the tracking module 128 through the use of, for example, a data upload wizard. As such, an individual's interaction with both online and offline marketing assets may be tracked by the tracking module 128 and stored in database 112. Again, these tracked interactions are only exemplary. The tracking module 128 may be automatically configured to track any kind of activity associated with a marketing asset, or the marketer 104 may custom define any kind of activity to be tracked by the tracking module 128.

In general, at step 208, the types of activity tracked may be categorized by inbound activity (i.e., tracked activity initiated by a potential customer 116, such as his or her click-throughs on a marketer's website) and/or outbound activity (i.e., tracked activity initiated by a marketer 104, such as the mere sending of an e-mail or a print mail). Any number of categorizes may be employed, and, in certain embodiments, the categorizes are custom defined by a marketer 104.

In addition, the tracking module 128 may store the tracked activity in the database 112 at step 208 in any suitable manner. For example, the tracking module 128 may store the tracked activity in tables. To illustrate, information relating to a batch of e-mails that was sent to a marketer-defined list of contacts 116 may be stored in several tables that define the content that was sent (i.e., that identify the marketing asset and its content), to whom the content was sent, and the associated responses in the form of, for example, clicks and opens.

At some point after a number of interaction(s) of one or more individuals 116 have been tracked by the tracking module 128 and stored in the database 112, the database 112 is queried by the determination module 132 to determine whether the individuals 116 have interacted with one or more marketing assets in accordance with defined criteria. More specifically, the determination module 132 first selects, at step 212, one of the plurality of individuals $116^1$-$116^N$ for analysis. Then, at step 216, the determination module 132 selects a marketing asset previously provided to that individual 116 in connection with a marketing campaign so as to analyze, at step 220, the individual's interaction therewith. In particular, the database entries storing the record of the selected individual's interactions with the selected marketing asset are examined, at step 220, to determine whether that individual 116 interacted with the marketing asset in accordance with defined criteria. In one embodiment, the criteria is selected by the marketer 104 and its purpose is to provide a threshold for determining whether to associate (i.e., link) the selected individual 116, at step 224, with the marketing campaign to which the marketing asset is connected. In other words, the purpose of the criteria is to provide a threshold beyond which the marketer 104 can say that the marketing campaign with which the selected marketing asset is connected in fact influenced the selected individual 116 and contributed to his or her decision purchase the marketed product or not.

For example, a marketer 104 may set an interaction criteria for an e-mail to be that an individual 116 accessed certain hyperlinks within the body of the e-mail. In such a case, if the database record indicates that the selected individual 116 in fact accessed the identified hyperlinks within the body of the e-mail, that individual 116 will be associated (i.e., linked), at step 224, with the marketing campaign for which that e-mail was a part of. If, on the other hand, the database record indicates that the selected individual 116 only opened the e-mail, but did not access any hyperlinks therein, that individual 116 will not be associated (i.e., linked), at step 224, with the marketing campaign for which that e-mail was a part of. Similar threshold criteria may be provided by a marketer 104 for all other marketing assets that the marketer 104 wishes to analyze. For example, for an individual 116 to be associated with a marketing campaign in which a print mail was sent, the individual 116 may have had to take an action identified in the print-mail (such as call a telephone number or access a website). For an individual 116 to be associated with a marketing campaign in which a telephone calling campaign was employed, the individual 116 may have had to press a certain number of telephone keys on his telephone keypad or have had to respond to certain voice prompts, rather than simply having answered the telephone call. In other words, to be associated with the marketing campaign in which the telephone calling campaign was employed, the individual 116 may have had to proceed a certain distance into the automated telephone script. As other examples, a user may have had to fill in certain portions of a web form (rather than simply having accessed or returned the web form), accessed certain links on a landing page of a marketer's website (rather than simply having visited the page), participated in some fashion in an online event, such as a webinar (rather than simply having attended/viewed the online event), responded to certain specific questions in a survey (rather than having just partially completed and returned the survey), and visited a marketer's booth at a tradeshow (rather than simply having been invited to, or having briefly attended, the tradeshow) in order to be associated with (i.e., linked to) the respective marketing campaigns for which those marketing assets were a part of. Again, these various thresholds are only exemplary. Individual marketers 104 may set higher or lower thresholds based on their individual criteria for associating a potential customer 116 with a marketing campaign.

Moreover, in various embodiments, criteria may be combined. For example, for a marketing campaign having both an e-mail mailing campaign and an online event associated therewith, the criteria for associating, at step 224, an individual 116 with the marketing campaign may be that either: i) the individual 116 accessed content (i.e., clicked on a hyperlink) in the e-mail; or ii) attended the online event and also opened the e-mail. In such a case, if the individual 116 only opened the e-mail (but did not access its content), or only attended the online event (even if he participated heavily therein), the individual 116 will not be associated with that marketing campaign at step 224. In cases where criteria is combined, the determination module 132 selects a plurality, rather than just one, marketing asset for analysis at step 216.

If, at step 220, the determination module 132 determines that the selected individual 116 interacted with the selected marketing asset in accordance with defined criteria (i.e., a "YES" answer is provided at step 220), the association module 136 associates, at step 224, the individual 116 with the marketing campaign in question. In particular, the association module 136 may store in the computer memory 160 a record linking the selected individual 116 to the marketing campaign in question. The record may simply take the form of, for example, a list identifying each individual 116 associated with each particular marketing campaign. Control then returns to the determination module 132 at step 228, as further described below.

If, on the other hand, the determination module 132 determines that the selected individual 116 did not interact with the selected marketing asset in accordance with the defined criteria (i.e., a "NO" answer is provided at step 220), step 224 is bypassed and the association module 136 does not associate the individual 116 with the marketing campaign in question. Rather, the determination module 132 proceeds to implement step 228.

At step 228, the determination module 132 determines whether further marketing assets that have not yet been analyzed were provided to the individual 116 who was selected at step 212. If so, the determination module 132 returns to step 216 to select one or more of those further marketing assets for analysis at step 220, as described above. If not, the determination module 132 determines, at step 232, whether more individuals are left to be analyzed. If so, the determination module 132 returns to step 212 to select one of those remaining individuals and proceeds to repeat the steps following step 212, as described above.

Once it has been determined which individuals 116 are associated with which marketing campaigns (i.e., a "NO" answer is provided at step 232), the scoring module 140 computes, at step 236, a lead score for each individual $116^1$-$116^N$. In one embodiment, the scoring module 140 does so without regard to whether an individual 116 under examination has been associated with a particular marketing campaign or not (i.e., without regard to the results of steps 212-232). In particular, in implementing step 236, the scoring module 140 may compute, and assign in the computer memory 160, at least one score for each individual $116^1$-$116^N$ based upon that individual's interactions with all of the marketing assets that were provided to him or her at step 204, regardless of whether or not those marketing assets are associated with marketing campaigns with which the individual 116 is not also associated. In another embodiment, the score for an individual 116 is also affected by properties personal to the individual 116, such as, for example, the industry in which he or she works and his and/or her job title.

Figure 3:
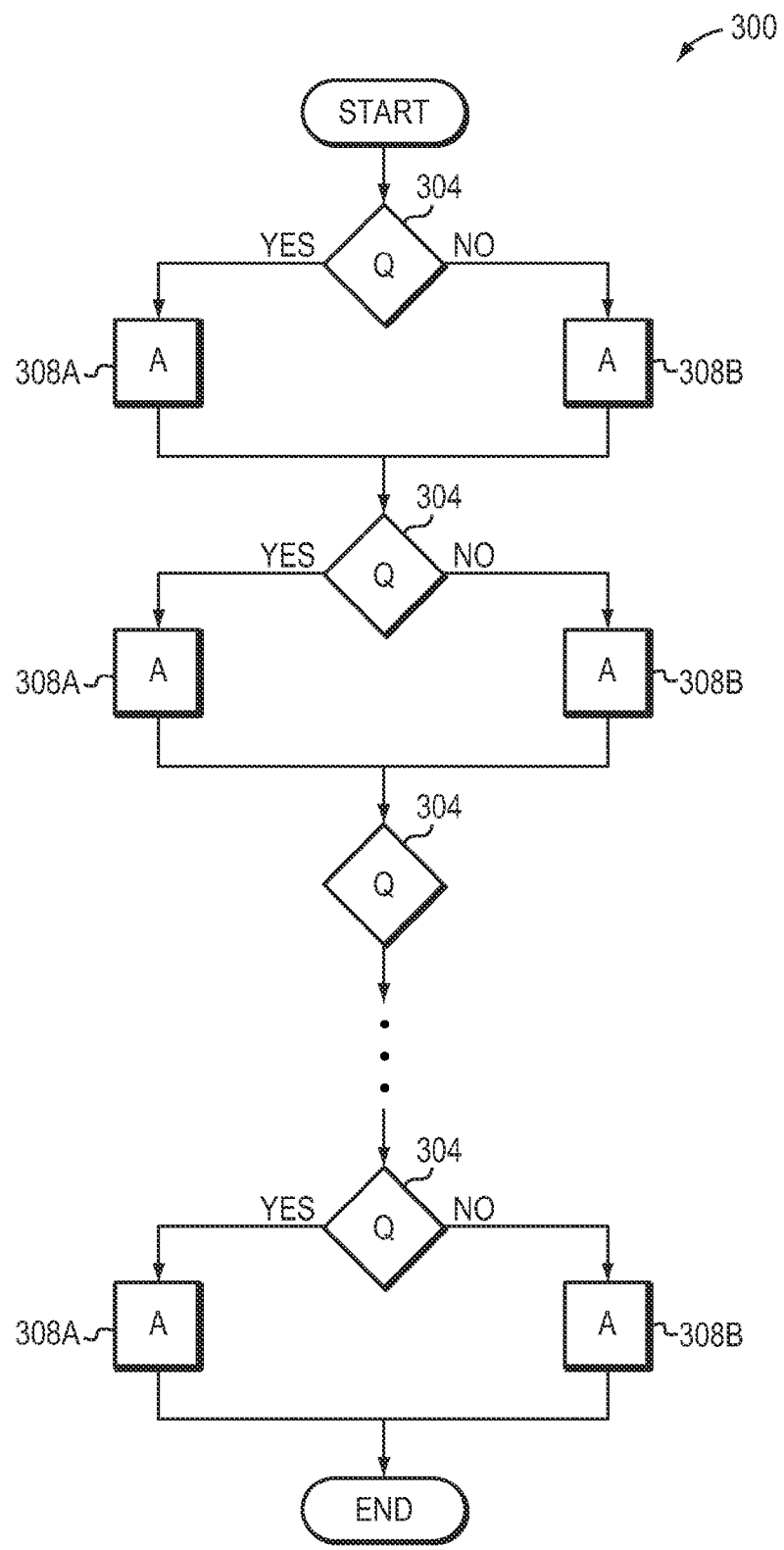
FIG. 3 is a flow diagram of an illustrative embodiment of a lead scoring process in accordance with the invention.

In one embodiment, in order to lead score an individual 116, the scoring module 140 automatically considers a series of questions and, based upon the responses thereto, increases the individual's lead score, decreases the individual's lead score, or leaves the individual's lead score unchanged. The process of lead scoring an individual 116 may be visualized by considering the flowchart 300 depicted in FIG. 3. Each question 304 relates to how the individual 116 interacted with a given marketing asset, and whether the answer thereto is given by block 308A or 308B depends upon the information previously stored by the tracking module 128 in the database 112. For example, a block 304 may question whether an individual 116 opened an e-mail he or she was sent by the marketing module 124, or may question whether the individual accessed a hyperlink provided in the body of that e-mail. The scoring module 140 then retrieves the answer from the tracked information stored in the database 112. If the answer is "YES" (which tends to increase the probability that the individual 116 is interested in a particular product and is thus a good lead), the individual's lead score may be increased (or left unchanged) at block 308A. If, on the other hand, the answer is "NO" (which tends to decrease the probability that the individual 116 is interested in a particular product and is thus a good lead), the individual's lead score may be decreased (or left unchanged) at block 308B. The individual's final lead score, which may represent the individual's overall interest in a product, is determined once the scoring module 140 has proceeded to answer all questions 304 and reached the end of the flowchart 300.

In one embodiment, the questions 304 and the amounts by which the individual's lead score are increased or decreased at blocks 308A and 308B are custom-definable by a marketer 104. For example, the scoring module 140 may provide a template to the marketer 104 such that the marketer 104 may create a flowchart similar to that depicted in FIG. 3.

The lead scoring process may be automatically executed by the scoring module 140 for each individual $116^1$-$116^N$. Once complete, each individual $116^1$-$116^N$ may be ranked, at step 240, by the ranking module 144 based upon that individual's lead score. The ranking module 144 may then store each such rank in the computer memory 160. In general, the rank for an individual 116 defines the quality of the individual as a lead. As an illustrative example, if an individual's lead score is greater than or equal to 100, that individual 116 may ranked as an "A" lead (i.e., of highest quality); if an individual's lead score is between 51 and 99, that individual 116 may be ranked as a "B" lead; if an individual's lead score is between 26 and 50, that individual 116 may be ranked as a "C" lead; if an individual's lead score is between 10 and 25, that individual may be ranked as a "D" lead; and if an individual's lead score is less than 10, that individual may be ranked as an "E" lead (i.e., of the lowest quality). Again, the number of ranks and the thresholds at which an individual 116 crosses from one rank into another may be custom-definable by a marketer 104.

In one embodiment, the scoring module 140 assigns a plurality of scores to an individual 116 over time, and the ranking module 144 assigns, and stores in the computer memory 160, a plurality of ranks to the individual 116 over time. Each such score and rank may be associated with a particular time frame. For example, in a four week span, an individual 116 may have his or her lead score calculated four times (e.g., once a week) such that the four lead scores represent the individual's level of interaction with the marketing assets that he or she was provided (and thus his or her interest in a particular product) during particular time frames. The four calculated lead scores may represent, for example, the individual's level of interaction: i) during the first week alone, during the second week alone, during the third week alone, and during the fourth week alone; or ii) during the first week alone, during the first and second weeks in combination, during the first, second, and third weeks in combination, and during the first, second, third, and fourth weeks in combination; or iii) during the first week alone, during the first and second weeks in combination, during the second and third weeks in combination, and during the third and fourth weeks in combination. Similarly, the ranking module 144 may update the individual's rank during these time periods based on the changes in his or her lead scores. Again, the frequency with which lead scores (and thus ranks) are calculated and the time periods that the lead scores (and thus ranks) cover may be custom-definable by a marketer 104.

Once a lead score has been calculated for each of the individuals $116^1$-$116^N$ at step 236, and each of the individuals $116^1$-$116^N$ has been ranked at step 240, one or all of steps 244, 248, 252, and 256 may be performed. For example, at step 244, the scoring module 140 may identify, to a sales group within the marketer's organization, those individuals $116^1$-$116^N$ having a lead score greater than a given threshold, and who thus represent good sales leads. The scoring module 140 may do so, for example, by sending an e-mail to the sales personnel within the marketer's organization. Such an e-mail may be sent periodically, such as on the first business day of every week, every month, every quarter, etc.

Figure 4:
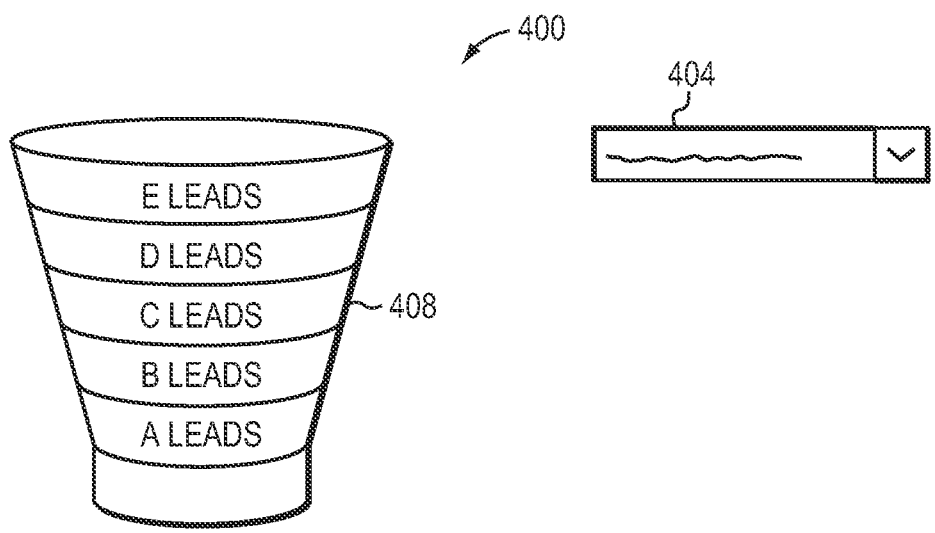
FIG. 4 is an exemplary graphical representation that illustrates, for a given marketing campaign, a relative distribution in the ranks of each potential customer found to be associated with that marketing campaign in accordance with the embodiments described herein.

At step 248, the presentation module 148 may present, for a given marketing campaign, a graphical representation of the ranks of each individual $116^1$-$116^N$ found to be associated, at step 224, with that marketing campaign. For example, as illustrated in FIG. 4, the presentation module 148 may provide a user input means, such as a pull-down menu 404, in a graphical user interface 400. The marketer 104 may employ that user input means 404 to select a marketing campaign of interest. Once a marketing campaign is selected by the marketer 104, the presentation module 148 may query the computer memory 160 to ascertain which individuals $116^1$-$116^N$ are associated with that campaign, and their respective ranks. Then, as illustrated by the exemplary funnel 408 of FIG. 4, the presentation module 148 may present in summary form a graphical depiction representing the percentage of "A" leads, "B" leads, "C" leads, "D" leads, and "E" leads associated with that campaign. More generally, however, the presentation module 148 may present this information, or other information of interest, in any format. For example, this information may be presented in a table, in a bar graph, in a pie-chart, or in any other manner.

In addition, at step 252, the marketer 104 may ask the system 100 to identify those individuals $116^1$-$116^N$ whose ranking changed (e.g., increased) as a result of a particular marketing campaign. In other words, the marketer 104 may ask the system 100 to identify those individuals $116^1$-$116^N$ whose interest in a particular product increased as a result of a particular marketing campaign for that product. To do so, the marketer 104 may first identify, to the analysis module 152, the particular marketing campaign and the time at which that marketing campaign began. Moreover, the marketer 104 may identify to the analysis module 152, or the analysis module 152 may select by default, a time period following the beginning time of the marketing campaign within which a change in an individual's rank can be deemed to have been caused by the marketing campaign. For example, a marketer 104 may identify "marketing campaign A," "Mar. 1, 2009" (i.e., the time at which marketing campaign A began), and "Mar. 31, 2009" (i.e., the cut-off date for observing a change in an individual's rank). In one embodiment, the analysis module 152 then queries the computer memory 160 to determine each individual $116^1$-$116^N$ who was associated, at step 224, with marketing campaign A. Once apprised of those individuals 116, the analysis module 152 may then query the computer memory 160 to identify their respective ranks on Feb. 28, 2009, and whether any of their respective ranks increased therefrom at some point on or after Mar. 1, 2009, but prior to Mar. 31, 2009. If so, the analysis module 152 may identify to the marketer 104 those individuals 116 whose ranks increased and who can thus be said to have had their interest in a particular product increased as a result of the marketing campaign. Such information may be used by a marketer 104 for many purposes, including assessing the success of the marketing campaign. Moreover, the marketer 104 may chose to pass such information on to a sales team of its organization to aid in closing a sale.

Alternatively, in step 252, rather than deeming a change in an individual's rank to have been caused by the marketing campaign if it occurs within a set time period following the beginning time of the marketing campaign, the change in the individual's rank may instead be deemed to have been caused by the marketing campaign if it occurs within a set time period following the individual's association with the marketing campaign. In this embodiment, the marketer 104 identifies, to the analysis module 152, a time frame for determining causality (which may instead be selected by the analysis module 152 by default) and the particular marketing campaign of interest. For example, a marketer 104 may identify "2 weeks" and "marketing campaign A". In one embodiment, the analysis module 152 then queries the computer memory 160 to determine each individual $116^1$-$116^N$ who was associated, at step 224, with marketing campaign A and the respective date of association for each such individual 116. Then, the analysis module 152 may query the computer memory 160 to identify those individuals' respective ranks on the day just prior to the date of their respective association with the marketing campaign being analyzed, and whether any of their respective ranks increased therefrom within the following two weeks. If so, the analysis module 152 may identify to the marketer 104 those individuals 116 whose ranks increased within those two weeks and who can thus be said to have had their interest in a particular product increased as a result of the marketing campaign.

Further, at step 256, the financial analysis module 156 may attribute in the computer memory 160, across one or more marketing campaigns, the revenue from a sale of a product to a particular individual 116. For example, individual "A" may have been associated, at step 224, with marketing campaigns "B," "C," and "D." Each of marketing campaigns "B," "C," and "D" may have marketed product "E" for sale, and individual "A" may have purchased product "E" for $120. Following the sale to individual "A," the marketer 104 may interact with financial analysis module 156 to attribute that revenue across marketing campaigns "B." "C," and "D" in any way. For example, the marketer 104 may choose to have the financial analysis module 156 attribute the revenue evenly across all three campaigns, to attribute all the revenue to a single campaign, to attribute no revenue to a certain campaign, or to attribute the revenue in different proportions across all campaigns. The marketer 104 may make his decision, and provide his input to the financial analysis module 156, subjectively. In one embodiment, the marketer's decision is made before hand, and the financial analysis module 156 automatically attributes revenue in accordance with the marketer's decision upon the occurrence of each sale to each individual, or at periodic intervals. Alternatively, the marketer 104 may take a more objective approach. For example, if the marketing campaigns "B," "C," and "D" each began at different times and/or covered different time periods, the marketer 104 may first choose to determine, as described above, whether the individual's rank changed within certain time periods following the beginning of each marketing campaign. Such information may be of interest to the marketer 104 in determining how to attribute the revenue across the various marketing campaigns. Again, the marketer 104 may custom-define automatic rules to handle this more objective attribution of revenue such that the financial analysis module 156 may then automatically attribute such revenue based on those custom rules.

In addition to attributing revenue across campaigns, the financial analysis module 156 may also accept input from marketers 104 that identifies high-level budget and actual cost information associated with particular marketing campaigns (e.g., design costs, costs incurred in participating in a tradeshow, etc.). In this way, the financial analysis module 156 may also calculate metrics and generate reports that enable a marketer 104 to truly evaluate the level of success of each campaign and success across campaigns. The calculated metrics may include the return on investment for each campaign, the cost per individual 116 associated with a particular campaign, the return on investment per individual 116 associated with a particular campaign, the cost per "A" lead associated with a particular campaign, the return on investment per "A" lead associated with a particular campaign, or any other suitable metric that may be derived from the data collected, generated, and stored in accordance with the exemplary approaches described herein.

Finally, in an alternative embodiment, the scoring module 140 may, at any point following step 208, query the database 112 to determine, based upon an individual's tracked interactions with marketing assets, a stage at which the individual 116 is at in a buying cycle. To do so, the marketer 104 first employs the scoring module 140 at step 260 to select a particular individual. Then, at step 264, rather than employing the lead scoring methodology described above, the scoring module 140 may instead query the database 112 for particular interactions of the individual 116 that are indicative of whether that individual 116 is at an early "Market Education" stage (i.e., seeking to educate himself about different products), a middle "Vendor Discovery" stage (i.e., attempting to decide which vendor, from amongst a handful, to purchase a product from), or a late "Vendor Selection/Validation" stage (i.e., readying himself to purchase a particular product from a particular vendor). For example, the scoring module 140 may classify an individual 116 who has done nothing more than attend a marketer's tradeshow as being at the early "Market Education" stage, may classify an individual 116 who has accessed content on a marketer's website relating to general product descriptions and/or case studies as being at the middle "Vendor Discovery" stage, and may classify an individual 116 who has accessed specific pricing information for one or a select few specific product(s) as being at the late "Vendor Selection/Validation" stage. Again, the particular interactions used to classify an individual 116 may be custom-definable by the marketer 104, and the interactions described herein as being useful for determining the stage at which an individual 116 is at in a buying cycle are only exemplary. Once the marketer 104 has gathered such information on an individual 116, the marketer 104 may use the information for any purpose. For example, the marketer 104 may choose to send particular additional marketing information to an individual 116 who is at the middle "Vendor Discovery" stage (such as a promotional e-mail, print-mail, etc.) to further promote a particular product. As another example, the marketer 104 may wish to draw a sales team's attention to an individual 116 who is classified as being at the late "Vendor Selection/Validation" stage. The sales team may then approach that individual 116, for example with a direct telephone call, in an effort to close the sale.

Accordingly, by tracking individuals' interactions with marketing assets, embodiments of the invention described herein may ascertain whether the marketing assets associated with a particular marketing campaign in fact influenced an individual 116 and contributed to his or her purchasing decision. In many ways, as described herein, this gives a much deeper insight into the effectiveness of each campaign.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for analyzing the influence of marketing assets, the method comprising:

storing, in a database, records of an individual's interactions with a first marketing asset of a first marketing campaign and of the individual's interactions with a plurality of additional marketing assets, each marketing asset selected from the group consisting of an e-mail, a print-mail, a calling campaign, a web form, a page on a website, an online event, a survey, and a tradeshow;

querying the database to determine whether the individual interacted with the first marketing asset in accordance with defined criteria;

if the individual interacted with the first marketing asset in accordance with the defined criteria, associating, in computer memory, the individual with the first marketing campaign, the association identifying the individual as having been influenced by the first marketing campaign;

if the individual did not interact with the first marketing asset in accordance with the defined criteria, refraining from associating, in the computer memory, the individual with the first marketing campaign;

analyzing the stored records of the individual's interactions with the first marketing asset and the plurality of additional marketing assets by querying the database with a series of inquiries relating to how the individual interacted with the first marketing asset and the plurality of additional marketing assets and assigning, in the computer memory, at least one score to the individual based upon responses to the series of inquiries, the score being increased by responses tending to increase a probability that the individual is interested in a product and being decreased by responses tending to decrease the probability that the individual is interested in the product, whereby the computer memory records, in connection with the first marketing campaign, an identification of an individual determined to have been influenced by the first marketing campaign and a separate score related to that individual that represents the individual's level of interest in the product; and querying the database to determine, based upon the individual's interactions with the first marketing asset and the plurality of additional marketing assets, a stage at which the individual is at in a buying cycle, the stage being at least one of a stage at which the individual is seeking education about different products, a stage at which the individual is attempting to decide which vendor to purchase a product from, or a stage at which the individual is readying to purchase a particular product from a particular vendor.

2. The method of claim 1 further comprising ranking the individual based upon the individual's assigned score, and storing the individual's rank in the computer memory.

3. The method of claim 2 further comprising assigning, in the computer memory, a score to each of a plurality of additional persons based upon each person's interactions with the first marketing asset and the plurality of additional marketing assets.

4. The method of claim 3 further comprising ranking each person based upon the person's assigned score, and storing the persons' ranks in the computer memory.

5. The method of claim 4 further comprising presenting, for the first marketing campaign, a graphical representation of the ranks of each individual and person associated with the first marketing campaign.

6. The method of claim 2, wherein a plurality of scores are assigned to the individual over time and a plurality of ranks for the individual are stored in the computer memory over time, each rank associated with a particular time frame.

7. The method of claim 6 further comprising i) identifying a change in the individual's rank from a first time frame to a second time frame and ii) determining whether the change in the individual's rank occurred within a set time period from a beginning of the first marketing campaign.

8. The method of claim 1, wherein the individual's score exceeds a threshold and the method further comprises identifying the individual to a sales group.

9. The method of claim 1, wherein the individual is associated, in the computer memory, with a plurality of marketing campaigns, and further comprising attributing, in the computer memory, revenue from a sale across the plurality of campaigns.

10. The method of claim 9, wherein the revenue is attributed across the plurality of campaigns in accordance with user input.

11. A system that analyzes the influence of marketing assets, the system comprising:

a database that stores, in response to commands from a computer processor, records of an individual's interactions with a first marketing asset of a first marketing campaign and of the individual's interactions with a plurality of additional marketing assets, each marketing asset selected from the group consisting of an e-mail, a print-mail, a calling campaign, a web form, a page on a website, an online event, a survey, and a tradeshow;

a determination module that queries the database to determine whether the individual interacted with the first marketing asset in accordance with defined criteria;

an association module that (i) associates, in computer memory, the individual with the first marketing campaign if the individual interacted with the first marketing asset in accordance with the defined criteria, the association identifying the individual as having been influenced by the first marketing campaign, and (ii) refrains from associating, in the computer memory, the individual with the first marketing campaign if the individual did not interact with the first marketing asset in accordance with the defined criteria; and a scoring module that:

(i) analyzes the stored records of the individual's interactions with the first marketing asset and the plurality of additional marketing assets by querying the database with a series of inquiries relating to how the individual interacted with the first marketing asset and the plurality of additional marketing assets and assigning, in the computer memory, at least one score to the individual based upon responses to the series of inquiries, the score being increased by responses tending to increase a probability that the individual is interested in a product and being decreased by responses tending to decrease the probability that the individual is interested in the product, whereby the computer memory records, in connection with the first marketing campaign, an identification of an individual determined to have been influenced by the first marketing campaign and a separate score related to that individual that represents the individual's level of interest in the product; and (ii) queries the database to determine, based upon the individual's interactions with the first marketing asset and the plurality of additional marketing assets, a stage at which the individual is at in a buying cycle, the stage being at least one of a stage at which the individual is seeking education about different products, a stage at which the individual is attempting to decide which vendor to purchase a product from, or a stage at which the individual is readying to purchase a particular product from a particular vendor.

12. The system of claim 11 further comprising a ranking module that ranks the individual based upon the individual's assigned score, and that stores the individual's rank in the computer memory.

13. The system of claim 12, wherein the scoring module further assigns, in the computer memory, a score to each of a plurality of additional persons based upon each person's interactions with the first marketing asset and the plurality of additional marketing assets.

14. The system of claim 13, wherein the ranking module further ranks each person based upon the person's assigned score, and stores the persons' ranks in the computer memory.

15. The system of claim 14 further comprising a presentation module that presents, for the first marketing campaign, a graphical representation of the ranks of each individual and person associated with the first marketing campaign.

16. The system of claim 12, wherein the scoring module assigns a plurality of scores to the individual over time and the ranking module stores a plurality of ranks for the individual in the computer memory over time, each rank being associated with a particular time frame.

17. The system of claim 16 further comprising an analysis module that i) identifies a change in the individual's rank from a first time frame to a second time frame and ii) determines whether the change in the individual's rank occurred within a set time period from a beginning of the first marketing campaign.

18. The system of claim 11, wherein the individual's score exceeds a threshold and the scoring module identifies the individual to a sales group.

19. The system of claim 11, wherein the association module associates, in the computer memory, the individual with a plurality of marketing campaigns, and further comprising a financial analysis module that attributes, in the computer memory, revenue from a sale across the plurality of campaigns.

20. The system of claim 19, wherein the financial analysis module attributes the revenue across the plurality of campaigns in accordance with user input.

21. An article of manufacture storing computer-readable instructions thereon for analyzing the influence of marketing assets on an individual, the article of manufacture comprising:
   instructions that (i) track the individual's interactions with a first marketing asset of a first marketing campaign and the individual's interactions with a plurality of additional marketing assets, and (ii) transmit records of the interactions to a database for storage thereat, each marketing asset selected from the group consisting of an e-mail, a print-mail, a calling campaign, a web form, a page on a website, an online event, a survey, and a tradeshow;
   instructions that query the database to determine whether the individual interacted with the first marketing asset in accordance with defined criteria;
   instructions that (i) associate, in computer memory, the individual with the first marketing campaign if the individual interacted with the first marketing asset in accordance with the defined criteria, the association identifying the individual as having been influenced by the first marketing campaign, and (ii) refrain from associating, in the computer memory, the individual with the first marketing campaign if the individual did not interact with the first marketing asset in accordance with the defined criteria;
   instructions that analyze the stored records of the individual's interactions with the first marketing asset and the plurality of additional marketing assets by querying the database with a series of inquiries relating to how the individual interacted with the first marketing asset and the plurality of additional marketing assets and assigning, in the computer memory, at least one score to the individual based upon responses to the series of inquiries, the score being increased by responses tending to increase a probability that the individual is interested in a product and being decreased by responses tending to decrease the probability that the individual is interested in the product, whereby the computer memory is able to record, in connection with the first marketing campaign, an identification of an individual determined to have been influenced by the first marketing campaign and a separate score related to that individual that represents the individual's level of interest in the product; and
   instructions that query the database to determine, based upon the individual's interactions with the first marketing asset and the plurality of additional marketing assets, a stage at which the individual is at in a buying cycle, the stage being at least one of a stage at which the individual is seeking education about different products, a stage at which the individual is attempting to decide which vendor to purchase a product from, or a stage at which the individual is readying to purchase a particular product from a particular vendor.

22. The article of manufacture of claim 21 further comprising instructions that rank the individual based upon the individual's assigned score, and that store the individual's rank in the computer memory.

23. The article of manufacture of claim 22 further comprising instructions that assign, in computer memory, a score to each of a plurality of additional persons based upon each person's interactions with the first marketing asset and the plurality of additional marketing assets.

24. The article of manufacture of claim 23 further comprising instructions that rank each person based upon the person's assigned score, and that store the persons' ranks in the computer memory.

25. The article of manufacture of claim 24 further comprising instructions that present, for the first marketing campaign, a graphical representation of the ranks of each individual and person associated with the first marketing campaign.

26. The article of manufacture of claim 22, wherein the instructions that analyze comprise instructions that assign a plurality of scores to the individual over time and wherein the instructions that rank comprise instructions that store a plurality of ranks for the individual in the computer memory over time, each rank being associated with a particular time frame.

27. The article of manufacture of claim 26 further comprising i) instructions that identify a change in the individual's rank from a first time frame to a second time frame and ii) instructions that determine whether the change in the individual's rank occurred within a set time period from a beginning of the first marketing campaign.

28. The article of manufacture of claim 21, wherein the individual's score exceeds a threshold and the article of manufacture further comprises instructions that identify the individual to a sales group.

29. The article of manufacture of claim 21, wherein the individual is associated, in the computer memory, with a plurality of marketing campaigns, and further comprising instructions that attribute, in the computer memory, revenue from a sale across the plurality of campaigns.

30. The article of manufacture of claim 29, wherein the revenue is attributed across the plurality of campaigns in accordance with user input.

31. The method of claim 6 further comprising determining that an individual, associated in the computer memory with the first marketing campaign, has had his or her interest in a product increased as a result of the first marketing campaign by identifying a change between the individual's rank during a first time frame and the individual's rank during second time frame.

32. The method of claim 31, wherein the first time frame ends before the first marketing campaign begins, and the second time frame begins after the first marketing campaign has begun.

33. The method of claim 31, wherein the first time frame ends before the individual is associated with the first marketing campaign, and the second time frame begins after the individual has been associated with the first marketing campaign.

* * * * *